United States Patent [19]

Joo' et al.

[11] Patent Number: 4,728,535

[45] Date of Patent: Mar. 1, 1988

[54] METHOD OF MANUFACTURING THIN CARBON PRODUCTS

[75] Inventors: Louis A. Joo', Johnson City; Kenneth W. Tucker, Elizabethton; Frank E. McCown, Jr., Bristol, all of Tenn.

[73] Assignee: Great Lakes Carbon Corporation, Briarcliff Manor, N.Y.

[21] Appl. No.: 742,672

[22] Filed: Jun. 7, 1985

Related U.S. Application Data

[63] Continuation of Ser. No. 501,633, Jun. 6, 1983, abandoned.

[51] Int. Cl.$^4$ .............. B05D 5/12; C01B 31/00; D01F 9/16
[52] U.S. Cl. .................. 427/113; 427/115; 427/122; 264/29.4; 264/29.5; 423/447.9
[58] Field of Search .............. 427/113, 115, 122; 264/29.1, 29.4, 29.5; 423/447.2, 447.4, 447.9

[56] References Cited

U.S. PATENT DOCUMENTS

| | | | |
|---|---|---|---|
| 3,375,132 | 3/1968 | Geise | 427/113 |
| 3,847,833 | 11/1974 | Bailey | 423/447.9 |
| 3,936,535 | 2/1976 | Boder | 264/29.5 |
| 4,064,207 | 12/1977 | DeCrescente et al. | 423/447.7 |
| 4,226,816 | 10/1980 | Yamamoto et al. | 264/29.4 |
| 4,409,125 | 10/1983 | Nishino et al. | 423/447.9 |

FOREIGN PATENT DOCUMENTS

| | | | |
|---|---|---|---|
| 005687 | 12/1974 | Japan | 423/447.9 |
| 2109006 | 4/1983 | United Kingdom | |

Primary Examiner—John E. Kittle
Assistant Examiner—James J. Seidleck
Attorney, Agent, or Firm—A. J. Good; J. R. Magnone

[57] ABSTRACT

Thin carbon products are produced from cellulose material by impregnation with a carbonaceous material followed by curing and baking. The baked product may optionally be graphitized depending on end use.

16 Claims, No Drawings

METHOD OF MANUFACTURING THIN CARBON PRODUCTS

This is a continuation of application Ser. No. 06/501,633, filed June 6, 1983, now abandoned.

BACKGROUND OF THE INVENTION

1. Field of the Invention

The invention relates to a method for producing thin carbon products of controlled porosity useful, for example, as backing material for the catalyst layers of fuel cell electrodes, and for porous flow-through electrodes or impervious flow-by electrodes, such as those used in zinc-halogen batteries. Other electrochemically oriented applications also exist. The term "carbon" as used herein includes the graphite form of carbon.

2. Description of the Prior Art

It is known to use thin carbon structures as electrode substrates in electrochemical devices such as fuel cells and certain types of batteries. For example, U.S. Pat. No. 4,064,207 to DeCrescente et al. relates to a process for producing thin porous carbon sheets suitable for fuel cell electrode support plates wherein carbonizable filaments are chopped into short lengths, felted, sprayed with a resin binder, cured, and then carbonized. The disadvantages of this process include high raw material and processing costs, poor control of resin binder consistency compared to other carbonaceous materials, and relatively poor electrical conductivity and chemical stability of the finished product. Resins such as those employed in the reference have a relatively poor useful shelf life, especially at elevated temperatures, and viscosity changes with time during use. They also have poor graphitizability.

SUMMARY OF THE INVENTION

Our invention overcomes the outlined disadvantages of the conventional method for producing carbon products suitable for use in fuel cells and the like, wherein a carbon product of controlled porosity having a thickness in the range of about 0.25 to 5 mm is produced by a process comprising: (a) impregnating porous cellulose material of desired size and shape with an impregnant selected from the group consisting of coal tar, solvent-cut coal tar pitch, slurry oil and creosote oil and mixtures thereof; (b) curing the impregnated material; (c) baking the cured material to carbonize the impregnant; and (d) repeating steps (a), (b) and (c) if required until the desired porosity is achieved.

In the case of solvent-cut coal tar pitch, it is preferred that about 50-70 wt. % of a solvent such as quinoline be utilized, based on the weight of the coal tar pitch.

The term "slurry oil" as used herein is a clarified slurry oil, used as a preferred feedstock for the production of needle coke. It is often referred to simply as "clarified slurry." The material is also known to those skilled in the art as "decant oil" or "clarified oil." It is the bottoms product from the catalytic cracking of gas oil to produce gasoline.

Optionally, the porous cellulose material may be impregnated with an aqueous salt solution in an amount required to provide desired porosity in the final product and dried prior to impregnation with the carbonaceous material. Following curing and baking, the material is leached to remove the salt.

In one embodiment of the invention, the cellulose material is fabricated from wood pulp or cotton linters, impregnated, cured at a temperature in the range of about 90° C. to 300° C., and baked at a temperature in the range of about 500° to about 1200° C.

The baked material may be further heat-treated to a temperature in the range of about 1900° to 3200° C. to produce a semi-graphitized or graphitized product. In the case of salt impregnation, the leaching step may be omitted if the baked material is heat-treated in this temperature range.

Some advantages of utilizing the impregnants of the invention compared to a resin are: (1) better reproducibility and predictability of product properties; (2) better control of process, particularly the impregnation and cure steps; (3) much lower cost of impregnant; (4) better pliability of product which aids in subsequent processing; and (5) in the case of graphitization, better graphitizability, leading to better electrical conductivity and better chemical stability in end use. Also, a high degree of flexibility in the product is attained by our process, since an entire product line having characteristics that are tailor-made for a number of distinctly different applications may be manufactured. This is one of the several important distinctions in our process and those of the prior art.

DESCRIPTION OF THE PREFERRED EMBODIMENT

The following examples will further describe the invention. It is understood that these examples are provided to illustrate the practice of the inventio and are not intended as limiting beyond the limitations imposed by the appended claims.

EXAMPLE I

Twelve variously sized samples of flat cellulose paper fabricated from cotton linters, designated below, were impregnated with selected carbonaceous materials by immersing the paper for two minutes in the material, which was heated at the indicated temperature, and allowing the impregnated paper to drip essentially dry.

Except where noted, all samples were cured for 24 hours in air at about 225° C., baked in an inert or slightly reducing atmosphere on a heating schedule rising from ambient temperature to about 600° C. for eight hours, and then graphitized to about 2700° C. in a nitrogen atmosphere on a 30 hour cycle from ambient temperature. Properties of the resulting flat plates are given in the table below.

| Sample Identification: | | Area, | Average Product | Total |
| Paper | Impregnant | cm$^2$ | Thickness, mm | Porosity, % |
| --- | --- | --- | --- | --- |
| 1 | A | 79.8 | 1.65 | 81.3 |
| 2 | B | 82.6 | 0.46 | 76.0 |
| 3 | A | 94.7 | 0.94 | 73.9 |
| 3 | A | 92.7 | 0.91 | 60.7 |
| 3 | A | 92.0 | 0.91 | 65.6 |
| 1 | C | 68.5 | 1.73 | 69.0 |
| 1 | C | 81.9 | 1.56 | 64.4 |
| 1* | D | 109.8 | 1.96 | 61.6 |
| 3 | D | 139.7 | 1.19 | 45.7 |
| 3 | D | 140.8 | 1.24 | 47.5 |
| 3 | D | 140.8 | 1.17 | 43.9 |
| 1** | D | 178.0 | 1.88 | 34.8 |

*baked to 610° C. in 24 hours, cured and graphitized as specified
**cured for 24 hours at 225° C., baked in 144 hours to 610° C., reimpregnated, recured for 24 hours at 225° C., rebaked in eight hours to 600° C. and graphitized as specified Average Paper Thickness
1-2.23 mm
2-0.89 mm -continued 3-1.52 mm
Impregnant and Temperature Thereof During Immersion
A — Allied Chemical Co. Creosote designated "2564" at 50° C.
B — Allied Chemical Co. Creosote designated "2566" at ambient temperature
C — 50% Allied Chemical Co. Coal Tar designated "Spec. 524"/50% Allied Chemical Co. Creosote "2566" at 200° C.
D — Allied Chemical Co. Coal Tar "Spec. 524" at 200° C.

EXAMPLE II

A sample of flat cellulose paper having an average thickness of about 1.52 mm fabricated from cotton linters is immersed in a saturated aqueous solution of sodium chloride for one-half hour, allowed to drip-dry for about 12 hours, and then further dried at 105° C. in an oven for two hours. The dried sample is then dipped in Allied Chemical Co. Coal Tar "Spec. 524" at 200° C. for ten minutes and allowed to drip essentially dry. The impregnated sample is cured for 24 hours in air at about 225° C. and then baked on a heating schedule rising from ambient temperature to 600° C. in about 72 hours in an inert or slightly reducing atmosphere. The baked sample is finally leached by immersion in a cycling water bath for about 16 hours to remove the sodium chloride. The resulting carbon plate has an area of 55.7 cm$^2$, an average thickness of 2.62 mm and a total porosity of 46.4%.

EXAMPLE III

A sample of cylindrical tubular shaped cellulose paper fabricated from cotton linters having a length of about 11 cm, a diameter of about 6 cm and an average paper thickness of about 0.89 mm is immersed in Allied Chemical Co. creosote "2566" at ambient temperature for five minutes, and allowed to drip essentially dry. The impregnated cylinder is cured for 24 hours in air at about 225° C., baked in an inert or slightly reducing atmosphere on a heating schedule rising from ambient temperature to about 600° C. in eight hours, and then graphitized to about 2700° C. on an eight hour cycle from ambient temperature in a nitrogen atmosphere. The cylindrical tubular product has an average wall thickness of 0.50 mm and a total porosity of 75.0%.

The data clearly illustrate the versatility of the process in terms of total porosity levels and product thicknesses that can be made. Similar structures can be made by the process of the invention with lower porosities, essentially to the point of being impervious, although most current uses require a product with porosities in the approximate range of 30–85%. The pore size range, a very important characteristic along with total porosity and thickness, can be tailored by experimentation to specific requirements of different end-uses in fuel cell, advanced battery and other electrochemically related fields.

The proper control of the major processing steps, which consist of impregnating the cellulose substrates, curing them according to exacting conditions, baking and optionally graphitizing, is very critical to the success of the process. Each product requires differing combinations of the materials and processing, and specific conditions were determined depending on the product desired.

While the invention has been described in detail and with reference to specific embodiments thereof, it will be apparent to one skilled in the art that various changes and modifications can be made therein without departing from the scope and spirit thereof, and, therefore, the invention is not intended to be limited except as indicated in the appended claims.

We claim:

1. A process for the production of thin carbon plates useful in primary and secondary electrochemical cells and having a thickness from 0.25 mm to 5 mm and a porosity of 30% to 85% by volume comprising: (1) impregnating a cellulose sheet material consisting essentially of cotton linters with a carbonaceous impregnant selected from the group consisting of coal tar, solvent-cut coal tar pitch, slurry oil, creosote oil and mixtures thereof, (2) curing said impregnated material in air at a temperature from 90° to 300° C., and (3) baking said material in an inert or reducing atmosphere to carbonize the impregnant.

2. The process of claim 1 wherein the steps of impregnating, curing and baking are repeated until a desired porosity is reached.

3. The process of claim 1 wherein the impregnated material is cured in air for about 24 hours at about 225° C.

4. The process of claim 1 wherein the impregnated material is cured and then baked on a heating schedule rising from ambient to about 600° C. in about 8 hours.

5. The process of claim 1 for the production of carbon plates useful as electrodes in zinc-halogen batteries, wherein the impregnated material is cured, baked, and then graphitized in nitrogen on a schedule rising to a temperature in the range of from about 1900° to about 3200° C.

6. The process of claim 4 wherein the baked material is re-impregnated and re-baked on a heating schedule rising from ambient to about 600° C. in about 8 hours.

7. The process of claim 1 wherein the material is baked in an inert or reducing atmosphere for 8 to 72 hours.

8. A process for producing a porous carbon plate for use in a fuel cell and having a thickness of from 0.25 to about 2.6 mm and a porosity by volume of 30 to 85% comprising: (1) impregnating a paper sheet consisting essentially of cotton linters with a carbonaceous liquid selected from the group consisting of coal tar, solvent-cut coal tar pitch, slurry oil, creosote oil and mixtures thereof, (2) curing said impregnated material in air at a temperature from 90° to 300° C., (3) baking said material in an inert or reducing atmosphere to carbonize the impregnant, and (4) repeating said impregnation, cure and bake cycles until a desired porosity is achieved.

9. The process of claim 8 wherein the impregnated material is cured in air at about 225° C.

10. The process of claim 8 wherein the carbon plate is further heated to a graphitizing temperature in the range of 1900° to 3200° C.

11. The process of claim 10 wherein the graphitized material is re-impregnated, cured, baked, and graphitized until a selected porosity is achieved.

12. The process of claim 10 wherein the plate is heated to a graphitizing temperature of at least 2700° C.

13. The process of claim 8 wherein the carbonaceous liquid is creosote oil.

14. The process of claim 8 wherein the product is an essentially flat plate.

15. The process of claim 8 wherein the product is a tubular cylinder.

16. The process of claim 8 wherein the carbonaceous liquid is a blend of 50% creosote oil and 50% coal tar.

* * * * *